May 16, 1967        J. L. THOMPSON        3,320,360

TELEVISION TRACKING ERROR DETECTOR

Filed May 8, 1964        2 Sheets-Sheet 1

INVENTOR.
JULIAN L. THOMPSON

United States Patent Office 3,320,360
Patented May 16, 1967

3,320,360
TELEVISION TRACKING ERROR DETECTOR
Julian L. Thompson, China Lake, Calif., assignor to the United States of America as represented by the Secretary of the Navy
Filed May 8, 1964, Ser. No. 366,200
2 Claims. (Cl. 178—6.8)

The invention described herein may be manufactured and used by or for the Government of the United States of America for governmental purposes without the payment of any royalties thereon or therefor.

The present invention relates to apparatus for determining the exact location of an object in an otherwise uniform and contrasting field of view, and more particularly relates to a system which operates in conjunction with an optical unit to produce electrical signals representing the location of such object with respect to the axis of the optical unit. In a preferred embodiment, the system is particularly designed for use in tracking missiles and other space vehicles to obtain data as to the position and trajectory thereof.

Many methods of ascertaining the location of a target are known. Heretofore these methods have generally made use of photographic means for picturing the target image position on a film, and then measuring the location of the target by means of a calibrated film reader. While this procedure yields accurate measurements, it possesses the obvious disadvantage of requiring much time to process and read the film, which delay in many cases cannot be tolerated. Furthermore, the mechanical nature of film cameras presents problems of weight, complexity of construction, difficulty of alignment and maintenance.

One recently-developed improvement on the optical method above mentioned incorporates a television camera tube having a lens assembly for focusing upon the screen of the tube a scene in which an image of the object to be tracked appears upon a blank or uniform background. For example, the object may be a missile, and the background may be a portion of the sky or region in space through which the missile is traveling. The television screen is scanned by the cathode-ray beam of the camera tube to produce a pulse, or short-duration signal, from the missile image, and the time relationship derived between this pulse and the reference points representative of the initiation of each scanning cycle of the cathode-ray tube's deflection system. With this information, it is possible to determine the location of the missile image on the screen of the tube, and hence the location of the actual missile relative to the optical axis of the camera tube assembly. It is also possible to use the television camera tube as a monitor in which the image of the object remains centered on the screen as positional displacements of the object are continuously applied as an error-correction signal to govern the movement of the camera during the interval that the object is being tracked.

An electronic system such as above set forth eliminates many of the drawbacks inherent in mechanical trackers. Since the entire field of view is scanned continuously, video processing circuits can simultaneously perform both acquisition and tracking functions. Furthermore, versatility is provided by the number of scan modes, optical systems, and camera tube types that may be employed. For example, the latter may be vidicons or image orthicons, deflected either electromagnetically or electrostatically. The camera tubes may be provided with many different photosensitive surfaces for use under various conditions, such as with visible light, infrared, ultra violet, or low-light-level tracking.

One of the primary advantages of a camera tube tracker is its flexibility. This is shown by its employment for air-to-air missile guidance, where the positional output signals of the tracker have been utilized to actuate the servo components of a "seeker" system. Another application, and one of considerable importance, is for missile-launch tracking. In this operation, considerations of range safety require television coverage of the early stages of the missile launching. However, the use of telephoto lenses makes manual tracking difficult, and it would be of advantage to perform this function automatically. This would have the further benefit of permitting all personnel to be removed from the launching site during the firing of large missiles and space boosters, which generate noise levels dangerous to unprotected operators.

Other opportunities for the employment of camera tube techniques include horizon sensors and similar space applications. Such specialized systems utilize electrostatic camera tubes having various spectral-response characteristics, together with unique scanning systems such as incremental and spiral scanning. The application of such techniques to obital rendezvous of space vehicles and to their docking is particularly appropriate. In such cases the astronaut would be provided with an automatic tracking system which could be supplied by manual operation using the presentation on his monitor. Real-time video could also be telemetered to a control point by additional back-up operation and monitoring.

A recently-improved version of the above method of target tracking utilizes the video signal generated by the target in a closed circuit television system. From this video signal, the target's position can be determined with reference to the edges of the camera tube mosaic or raster from its time relationship to the line- and field-synchronizing or blanking pulses. The vertical position of the target (that is, its altitude) is derived or counted as the number of scanning lines from the top of the field (initiated by the vertical blanking pulses) to the target image. Correspondingly, the horizontal position of the target (that is, its azimuth) is derived as a number of predetermined time intervals, or counts, between the target image and the end of that particular scanning line in which it appears.

Such a system has yielded highly satisfactory results, but during operation a severe demand is placed on the respective counting circuits, especially that employed for determining the target's azimuth. This is because any determination of the target's position to a factor of $1/m$ of the length of the scanning line requires a frequency at least as high as $m$ times the line frequency. Inasmuch as it is necessary for proper operation of the tracking system to utilize a line frequency in the order of 16 kilocycles, the azimuth counting frequency must be no lower than approximately 4 megacycles.

In accordance with a feature of the present invention, the use of such a high frequency in determining the horizontal position of the target image is avoided by making use of a so-called "vernier principle" by means of which the required data may be derived by generating a further series of cyclically-recurring pulses at a frequency which may, for example, be slightly lower than that of the horizontal or line scanning generator. The oscillator for generating this further series of pulses does not operate continuously, but is respectively started and stopped at time instants when the video pulse from the target image appears on the camera tube raster and also at the time when the occurrence of one of its output pulses coincides with the generation of one of the horizontal blanking pulses. The number of output pulses from this "vernier" oscillator (that is, the number of predetermined time intervals that elapse between the target pulse production and the horizontal pulse coincidence) is representative of the horizontal position of the target image on the screen, or, in other words, the azimuthal location of the target. Similarly, vertical or altitude information is derived by counting the number of lines from the target pulse to the bottom of the raster, or, in other words, to the next occurrence of a vertical blanking pulse.

One object of the present invention, therefore, is to provide an improved form of tracking system by means of which the location of an object may be ascertained in an otherwise uniform and contrasting field of view.

An additional object of the invention is to provide a system for determining the azimuthal location of an object in a field of view scanned by a television camera through the counting of the number of predetermined time intervals that elapse between the instant that the scanning beam of the camera tube intercepts the target image appearing on the screen thereof and the end of that particular scanning line in which such target image appears.

An additional object of the invention is to provide a system whereby the time intervals so employed for determining time azimuthal position of the target image are of a duration slightly longer than those occurring between successive line synchronizing pulses, while at the same time providing an accurate measurement of the target's position on the photosensitive screen of the cathode-ray tube.

A still further object of the present invention is to provide a system of the type described in which the azimuthal position of the target image is derived by utilizing an additional oscillator operating at a frequency slightly lower than the frequency of occurrence of the line synchronizing pulses, the operation of this oscillator being initiated by the pulse produced when the electron scanning beam of the tube falls upon the image of the target, with the termination of said oscillator operation being brought about by the first time coincidence between an output pulse therefrom and a line-blanking pulse from the cathode-ray tube deflection generator.

Other objects, advantages, and novel features of the invention will become apparent from the following detailed description of the invention when considered in conjunction with the accompanying drawings, wherein.

Figure 1:
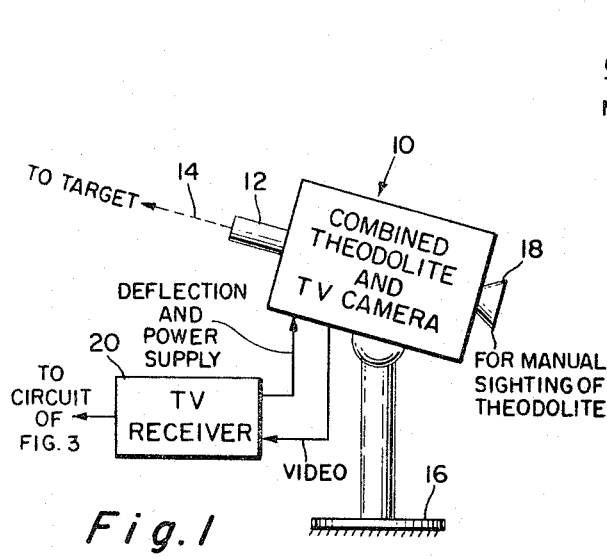
FIG. 1 is a schematic showing of a combined theodolite and television camera formed as a single unit designed to track or observe an object above the surface of the ground, both the theodolite and the television camera utilizing a common optical arrangement so that the unit may be manually oriented by an observer.

Referring now to FIG. 1 of the drawings, there is shown a combined theodolite and television camera, generally identified by the reference numeral 10. This unit 10 may be of conventional construction, and is so arranged that the two components thereof employ a common optical portion which includes the lens 12, the latter possessing an optical axis 14. The unit 10 is mounted for universal movement upon a base 16 so that the optical axis 14 may be aligned with some desired target (not shown) when the unit 10 is oriented by an observer who views the target through an eyepiece 18. The constructional details of the apparatus of FIG. 1 have not been shown in the drawings, since it forms no part of the present invention and incorporates elements which are well known to those skilled in the art to which the invention relates.

It is asusmed that the television camera of FIG. 1 is provided in the uusal manner with the standard sources of operating energy from a conventional receiver unit 20. The type of cathode-ray tube employed in the camera of unit 10 is not critical, although one of the orthicon type is preferable. The scanning frequencies for the electron beam of the camera tube are likewise not critical, but, as an example, the horizontal or line frequency may be 16.2 kilocycles and the vertical or field frequency the standard 60 cycles per second. For the purpose of explaining the operation of applicant's concept, it need only be recognized that the camera unit of FIG. 1 develops in its output a video signal representing the location or position of the target image on the screen of the cathode-ray tube, and that the scanning generators of the receiver 20 make available to the camera tube a series of horizontal or line synchronizing pulses at the mentioned frequency, together with a series of vertical or field synchronizing pulses. Such outputs require no modification of the standard television receiver and are only mentioned at this point to form a basis for a description of a preferred form of applicant's error detector to be set forth in connection with FIG. 3 of the drawings.

The present concept makes use of the "vernier" principle to avoid the necessity for employing any operating frequency higher than the line frequency utilized for horizontally deflecting the electron beam of the television camera of FIG. 1. For example, if L represents the line frequency of the horizontal oscillator, and if F represents the field rate or frequency of the vertical oscillator, then a principal feature of the present concept resides in the provision of a third oscillator V the frequency of which is $L-F$, and the operation of which is initiated or resynchronized by the video pulse developed when the electron beam intercepts the target image appearing on the screen of the cathode ray-tube forming part of the television camera. Due to the frequency difference between the horizontal oscillator and this additional oscillator V, there will be a time lapse between the development of the video pulse and the first time coincidence between a pulse from oscillator V and an output pulse from the horizontal oscillator. The duration of this time interval will depend upon the position of the video pulse along that particular scanning line in which such pulse is developed.

In the above example, it will be recognized that the number of scanning lines per field will be $$N=\frac{L}{F}$$

The number of pulses developed during each field from the so-called third or vernier oscillator V will be $(L-F)/F$ of $(L/F)-1$. The latter number is exactly one less than the number of scanning lines per field. Consequently, if the operation of the vernier oscillator V is initiated at some point on a particular raster line, then the next pulse in the output thereof will occur on the following line but delayed (or displaced to the right) by $1/(N-1)$ of the length of that particular line. Inasmuch as a portion of the time occupied by each line is utilized for retrace, then the displacement of the next pulse from the vernier oscillator V can be stated as $1/(N-1)$ of the *time* occupied by one scanning line. This "time" is the interval taken up between successive horizontal line-blanking pulses.

At the end of each line, there is a blanking pulse which terminates that particular line. When the accumulated time delay of the pulse output of the vernier oscillator V equals the time period between the occurrence of the video pulse and the development of the blanking pulse at the end of that particular line, then a pulse coincidence occurs and this acts to terminate the operation of the vernier oscillator and also to terminate the operation of a counter which is arranged to indicate the number of pulses which have been produced by the vernier oscillator V since the development of the video pulse generated at the time the scanning beam intercepts the target image on the cathode-ray tube screen. This indication n appearing on the counter represents $n/(N-1)$ times the length of one line, and thus yields a measure of the position of the target image in azimuth along a particular scanning line, and, consequently, the location of the actual target with respect to the optical axis 14 of the unit 10 of FIG. 1. In addition, the number of lines counted from the video pulse derived from the passage of the electron scanning beam over the target image to the bottom of that particular frame (or, in other words, to the occurrence of the next succeeding *vertical* blanking pulse) gives a measure of the position of the desired target in elevation. A comparision of this data with that taken from a target which lies on the optical axis 14 of FIG. 1 provides information as to the original tracking error, or, expressed differently, as to the original misorientation of the unit 10 of FIG. 1.

Before describing the construction and operation of a preferred embodiment of applicant's invention, it might be helpful to point out that the television camera of FIG. 1 has developed on the screen thereof an image 22 representing a target the deviation of which from a centered position (represented by the reference character $z$ in FIG. 2) it is desired to ascertain. The present concept, as indicated above, yields information as to the quantities $x$ (the distance between the target image 22 and the bottom of the screen, or, in other words, the elevation of the target) and $y$ (representing distance of the target image 22 and the right-hand boundary of tthe screen, or, in other words, the target's azimuth). The point $z$ in FIG. 2 is, of course, in coincidence with the optical axis 14 of the unit 10.

Figure 2:
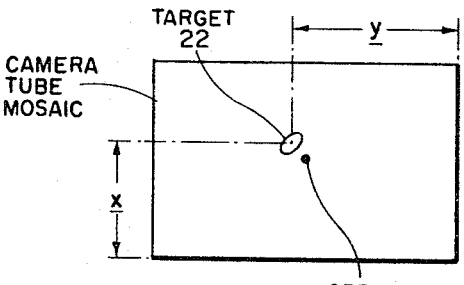
FIG. 2 is a representation of a target image in a field of view as it appears on the photosensitive screen of the camera of FIG. 1.

In describing the operation of that preferred embodiment of applicant's invention set forth herein, let it first be assumed that the position of the target is known to within plus or minus one degree in both elevation and azimuth, or, in other words, the target is displaced from the point $z$ in FIG. 2 by such amounts. Under such assumed conditions, the theodolite portion of the unit 10 of FIG. 1 is sighted at the anticipated point where the target is expected to appear. Since the optical components of the unit 10 are of a conventional type, it may be further assumed that the field of view of the theodolite is about 3° in diameter, and that both the elevation and azimuth indicia circles thereof can be read to within one minute of arc. It is desired to know the actual location of the desired target from the optical axis 14 to within this one minute of arc in each of the $x$ and $y$ coordinates.

Figure 3:
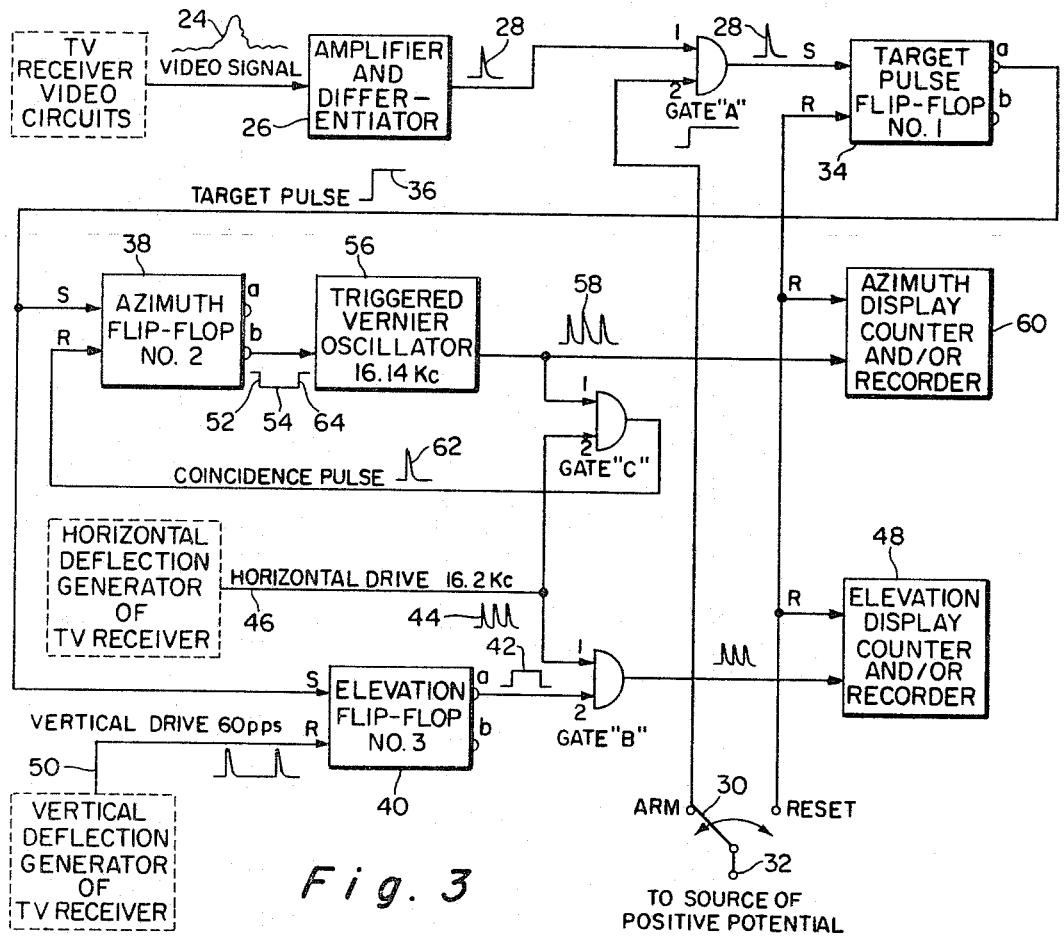
FIG. 3 is a block diagram of an error detector designed in accordance with the principles of the present invention and intended to be employed in conjunction with a television camera and receiver, such, for example, as to that illustrated in FIG. 1.

Since the television receiver 20 of FIG. 1 has been stated to be of conventional design, its field (or frame) scanning frequency may be assumed to be 60 cycles per second, and consequently a 270-line raster is developed of which 220 lines are visible on the screen of FIG. 2. The video output from the television receiver 20 is fed directly into the error detector circuit of FIG. 3, and to this system of FIG. 3 is also supplied a series of horizontal or line synchronizing pulses from the deflection generator (not shown) of the receiver 20 as well as a further series of frame synchronizing pulses from the corresponding vertical deflection generator. As shown in FIG. 3, the horizontal or line pulses occur at a frequency of 16.2 kilocycles, and the vertical or field synchronization occurs at a frequency of 60 cycles per second. These synchronizing pulses applied to the circuit of FIG. 3 are identical in all respects to those which are supplied from the television receiver 20 of FIG. 1 to the deflection means of the camera tube which forms part of the unit 10. The video output of the camera tube, after being processed by the television receiver 20, has a waveform such as represented by the reference numeral 24, and is applied directly to an amplifier and differentiator 26 which acts to modify the wave form of the pulse to that shown by the reference numeral 28. This differentiated pulse 28 is applied to a gate A having a pair of inputs as shown in the drawing. This gate A is opened for passage of the differentiated target pulse 28 when the network of FIG. 3 is armed by manual actuation of a switch 30 which supplies a positive potential to gate A from a source (not shown) connected to a terminal 32. The differentiated video pulse 28 which passes through gate A is received by a first flip-flop unit 34 which may comprise a conventional bi-stable multivibrator. It will be noted that the differentiated pulse 28 possesses a sharp positive leading edge, and this pulse, when applied as shown through the gate A, actuates the flip-flop unit 34 from one of its steady-state conditions to the other, thereby generating an output waveform such as indicated by the reference numeral 36. As illustrated, this output wave 36 is of essentially rectangular configuration, and rises sharply from one amplitude to another. The sudden rise of voltage at the output terminal $a$ of the flip-flop unit 34 is applied to the S input of a second flip-flop unit 38 and also to the S input of a third flip-flop unit 40. As shown in the drawing, the flip-flop unit 38 constitutes a portion of a network for determining the azimuthal position of the target image 22 on the screen of the television camera of unit 10, and the flip-flop unit 40 forms a portion of a network for determining the elevational characteristics of such image. The following description will bring out in detail the manner in which each of these networks acts to derive information as to the $x$ and $y$ coordinates of the target image, as shown in FIG. 2, and hence yield the required positional data.

It will be noted from FIG. 3 that each of the three flip-flop units 34, 38 and 40 possesses a pair of output terminals representing the two steady-state conditions of the respective networks. When the rectangular wave 36 appearing at the output terminal $a$ of the unit 34 is received by the third flip-flop unit 40, it changes the status of such unit and causes a rise in voltage at the output terminal $a$ thereof, as represented by the waveform 42. This results in the opening of a further gate B having two inputs to one of which the wave 42 is applied and to the other of which is applied the pulse series 44 which consists of the line synchronizing pulse output of the horizontal deflection generator which is received by the system of FIG. 3 over the conductor 46 as indicated. This pulse series 44 is at a frequency of 16.2 kilocycles, and passes through the gate B during the time that the latter is open to be registered on a display counter 48 (which may, in addition, incorporate suitable standard recording means) this display counter being of any conventional type which counts the number of pulses in the series 44 and makes such count available for observation by the system operator.

The display counter 48 thus has its operation initiated in the above manner, and registers the number of line pulses 44 applied thereto during the time that the gate B is open, the latter being opened upon the reception by the gate of the leading edge of the rectangular pulse 42. However, it is necessary that the gate B be closed at the end of the particular frame in question in order that the elevational characteristics of the target 22 be determined. This is accomplished by applying to the remaining one of the two input terminals of the flip-flop unit 40 a vertical blanking pulse derived from the deflection generator forming part of the television receiver 20 of FIG. 1, and which is received by the unit 40 over the conductor 50. This vertical blanking pulse, when received by the flip-flop unit 40, changes the status of the latter and produces the trailing edge of pulse 42. In other words, it decreases the amplitude of such pulse to a point where gate B can no longer remain open. Closing of this gate then precludes any further passage therethrough of the line pulses 44, and stops the register which forms part of the display counter 48. The number of pulses which have passed through the gate B during the time that it was open then are representative of the elevational characteristics of the target 22, as required.

With respect to the azimuthal information also needed to complete the operation of the error detector, it will be noted that the rectangular wave 36 which is applied to the elevation flip-flop unit 40 is also applied to the azimuth flip-flop 38. The reception by such unit of the pulse 36 causes a sudden drop in its output voltage at terminal b, as represented by the leading edge 52 of a further rectangular wave 54. This voltage drop is applied to a vernier oscillator 56 which may be of conventional design and preferably incorporates therein a control tube to the grid of which the rectangular wave 54 is applied. When this tube receives the wave 54, the drop in voltage represented by the leading edge 52 thereof activates the oscillator (which was up until then inoperative) and causes it to generate a series of positive voltage pulses 58 at a repetition rate of 16.14 kilocycles. These pulses 58 are applied as shown in FIG. 3 to a display register 60. The register 60 counts the number of pulses 58 so received until such time as the oscillator operation is terminated in a manner to be described subsequently.

The same pulses 58 from the vernier oscillator 56 (occurring at a rate of 16.14 kilocycles) are also applied to one input terminal of a dual input gate C of the "and" type. The other input terminal of gate C receives the line synchronizing pulses 44 from the horizontal deflection generator of the television receiver 20. However, since there is a frequency difference between the pulses 44 and 58, they do not arrive at their respective input terminals of gate C at the same time. Consequently, there is no output from gate C. This will be better appreciated when it is recalled that the pulses of the horizontal series 44 are developed at the end of each scanning line, whereas the target pulse 28 (which determines the generation of the leading edge of the rectangular pulse 36) is approximately in the center of the screen, and is only displaced slightly therefrom in accordance with the displacement of target 22. Furthermore, the vernier oscillator 56 is operating at a slightly lower frequency than the horizontal deflection generator of the television receiver 20, so that the two series of pulses 44 and 58 will eventually reach a point where a pulse of one series is in exact time coincidence with a pulse of the other series. Expressed differently, a pulse will then arrive at both the dual input terminals of gate C simultaneously. Since this gate is of the "and" type, an output pulse is obtained therefrom when such input pulse coincidence occurs. Such output pulse, herein termed a coincidence pulse, is identified in the drawing by the reference numeral 62, and is fed to the remaining input terminal R of the flip-flop unit 38. Such pulse 62, when received by the flip-flop 38, changes the status of the latter back to its initial condition, or, in other words, the voltage of wave 54 rises as shown by the trailing edge 64 thereof. This increases the voltage on the grid of the control tube which forms part of the vernier oscillator 56 and the latter ceases to operate.

The number shown by the register incorporated in the display counter 60 represents the number of pulses 58 generated by the vernier oscillator 56 from the time its operation was initiated until a coincidence occurred between a pulse from the series 44 and a pulse from the series 58. Inasmuch as there is a difference of $(16,200-16,140)/16,200=1/270$ in the periods of the horizontal deflection oscillator which forms part of the television receiver 20 and the vernier oscillator 56, each count represents $1/270$ of the length of each horizontal line, and thus the number of counts registered by the unit 60 defines the position of the target 22 of FIG. 2 along the particular raster line upon which it was encountered (represented by y in FIG. 2).

Figure 4:
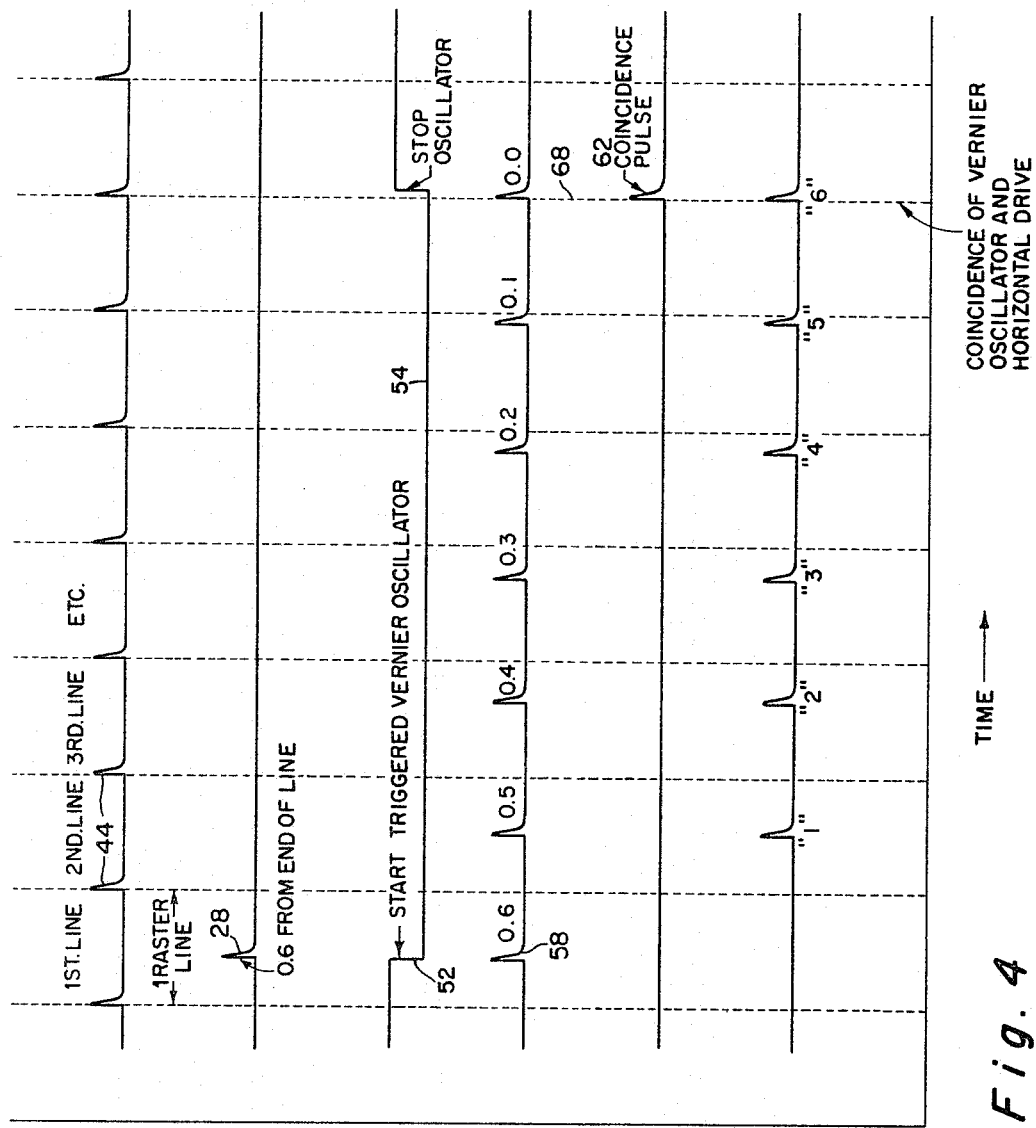
FIG. 4 is a set of waveforms useful in explaining the operation of the system of FIG. 3.

In FIG. 4 of the drawings is set forth a graphical representation of the manner in which the circuit of FIG. 3 operates. This graphical representation assumes a smaller number of scanning lines and shorter time intervals for the sake of clarity. The waveform a is the pulse series 44 of FIG. 3, each individual voltage excursion of which represents a blanking pulse which occurs at the end of each horizontal line-scanning action of the cathode-ray beam. The target pulse of wave b is that represented by the reference numeral 28 in FIG. 3, and is assumed for the sake of description to occur at a point equal to .6 of the distance from the end of a particular raster line. Waveform c represents the rectangular wave 54 which is applied to the vernier oscillator 56, and leading triggers such unit into operation at the time instant represented by the leading edge 52 thereof. The output of the vernier oscillator 56 which is thus triggered by the portion 52 of the rectangular wave 54 develops the pulse series 58 as illustrated in waveform d. Successive pulses of this series 58 occur at time spacings which decrease with respect to the horizontal drive pulses 44, as shown in FIG. 4, this decrease being illustratively represented by the occurrence of successive ones of the pulses 58 at points which successively .6, .5, .4, .3, .2, and .1 of the distance from the end of each horizontal line. The next pulse of the series 58 occurs at the time instant represented by the reference numeral 68, and at this time instant that particular pulse 58 coincides with one of the horizontal drive pulses 44 of waveform a. Upon such coincidence, the vernier oscillator 56 has its operation terminated by the coincidence pulse 62, as shown in waveform e, and this stops the display counter 60. The number of indications registered by such counter is shown in waveform f, which is the information desired as to the azimuthal position of the target 22 of FIG. 2.

The target pulse flip-flop unit 34 is actuated by the pulse 28 from gate A of FIG. 3, and it will not respond to succeeding video pulses 24. It consequently blocks any response to more than one target which may appear on the screen of FIG. 2. Furthermore, since the flip-flop units 38 and 40 have been reset, thereby stopping the input to both of the display counters 48 and 60, the latter will hold their respective accumulated counts so that they may be read by the system operator. This condition continues until the switch arm 30 is manually actuated to apply a "reset" pulse to the respective R input terminals of the two counters 48 and 60 and to the R input terminal of the flip-flop unit 34. In addition, opening of switch 30 closes the gate A which now blocks any incoming video pulse from reaching the flip-flop unit 34 until the operator is again ready to take a measurement.

To convert the data obtained in the above manner to meaningful information, a reading is taken in the same way using as the target some clearly visible object which lies exactly on the optical axis 14 of the theodolite which forms part of the unit 10. The difference between the two measurements will give the number of counts (indicated by the registers of the units 48 and 60) by which the target 22 is offset in both directions from the center point z of the television screen. This data is readily acquired, since the divided circles on the two axes of the theodolite give the direction of the optic axis. Therefore these "offset" counts, converted into angular data by a knowledge of the total angular field of view and then added to the circle readings, provide accurate information of the nature sought.

Since the number of azimuth counts (represented by wave f in FIG. 4) may be greater than the number of lines remaining in a particular frame before coincidence occurs between a pulse of the series 58 (waveform d) and a horizontal pulse of the series 44 (waveform a) such coincidence may not take place until during the next succeeding television frame. However, this is of no significance, since the horizontal drive pulses are developed continuously even during the vertical retrace period when a certain number of the horizontal lines of the raster are not visible, but during this period the horizontal oscillator remains operative to continuously produce the pulse series 44.

Obviously many modifications and variations of the present invention are possible in the light of the above the scope of the appended claims the invention may be practiced otherwise than as specifically described.

I claim:
1. In a system for determining the azimuthal characteristic of a target in a field of view with respect to one boundary of such field, the combination of:
   a television cathode-ray camera tube having a photosensitive screen;
   optical means for focusing said field of view onto the screen of said camera tube;
   a vertical deflection generator producing a series of output pulses at the field-scanning rate of the electron beam of said cathode-ray camera tube;
   a horizontal deflection generator for developing a series of output pulses to control the deflection of the electron beam of said camera tube at line-scanning frequency;
   a video output circuit from said camera tube in which the said target image appears as a pulse produced when the electron beam impinges that particular portion of the photosensitive screen on which the image of said target appears;
   means for differentiating the said target pulse to obtain therefrom a pulse having a steeply-rising leading edge;
   a first flip-flop network having two steady-state conditions, said network being initially in one of such conditions;
   a circuit for applying the differentiated target pulse to said first flip-flop network to cause the latter to attain the other of its steady-state conditions and thereby develop in the output thereof a rectangular pulse the leading edge of which is developed upon the change of said flip-flop network to its said other condition;
   a second flip-flop network likewise having two steady-state conditions and being placed in one of such conditions upon the reception thereby of the leading edge of the rectangular pulse output of said first flip-flop network;
   a triggered oscillator operating at a predetermined frequency;
   a connection for applying the output of said second flip-flop network to said oscillator to initiate the operation thereof when said second flip-flop network attains its said one condition, said oscillator producing in the output thereof a series of regularly-recurring data pulses at the said predetermined frequency;
   a first dual-input "and" gate to which the pulse output of said oscillator is applied;
   a connection for also applying to said first gate a series of pulses representing the output of the said camera tube horizontal deflection generator, said gate being opened upon the time coincidence of one of the pulses generated by said oscillator and one of the pulses representing the end of a cycle of operation of said horizontal deflection generator, so as to develop in the gate output circuit a single coincidence pulse representing such simultaneous input pulse occurrence;
   means for applying the coincidence pulse from said first gate to the said second flip-flop circuit to cause the latter to attain the other of its two steady-state conditions and thereby vary the signal applied therefrom to said oscillator to terminate the operation of the latter; and
   a counting circuit connected to said oscillator, whereby said counting circuit is effective to indicate the number of pulses developed by said oscillator during the time that it was in operation, such indication being representative of the desired azimuthal characteristic of said target.

2. A system according to claim 1, further including means for determining the elevational characteristic of said target, said further means comprising:
   a third flip-flop network to which is applied the rectangular pulse output of said first flip-flop network, said third flip-flop network likewise having two steady-state conditions and being placed in one of such conditions upon the reception thereby of the leading edge of such rectangular pulse from said first flip-flop network;
   a second gate to which the output of said third flip-flop network is applied;
   a circuit for likewise applying to said second gate the series of line-scanning pulses produced by said camera tube horizontal deflection generator, said second gate being opened by the reception of the pulse output from said third flip-flop circuit when the latter attains its said one condition to pass therethrough the horizontal pulse series also received thereby;
   a connection for applying to said third flip-flop network a signal representing the end of a cycle of operation of said camera tube vertical deflection generator, the reception by said third flip-flop network of one of such last-mentioned signals acting to change such network to the other of its two steady-state conditions and thereby alter the voltage output thereof as applied to said second gate, thereby closing the latter and shutting off the passage therethrough of the said horizontal pulses; and
   a counter for registering the number of horizontal pulses passed by said second gate during the time that the latter was open, the number of pulses so registered being indicative of the number of lines between the point at which the electron scanning beam of said camera tube impinged the image of said target and the bottom of said screen, and hence being representative of the elevational characteristic of said target with respect to one boundary of said field of view.

References Cited by the Examiner
UNITED STATES PATENTS

| | | | |
|---|---|---|---|
| 2,734,269 | 2/1956 | Claret | 178—6.8 |
| 2,970,187 | 1/1961 | Hinton | 178—6.8 |
| 3,046,332 | 7/1962 | Engler | 178—6.8 |
| 3,218,553 | 11/1965 | Peterson et al. | 343—13 |
| 3,257,505 | 6/1966 | Van Wechel | 343—7 |

DAVID G. REDINBAUGH, *Primary Examiner.*

P. SPERBER, J. A. ORSINO, *Assistant Examiners.*